UNITED STATES PATENT OFFICE.

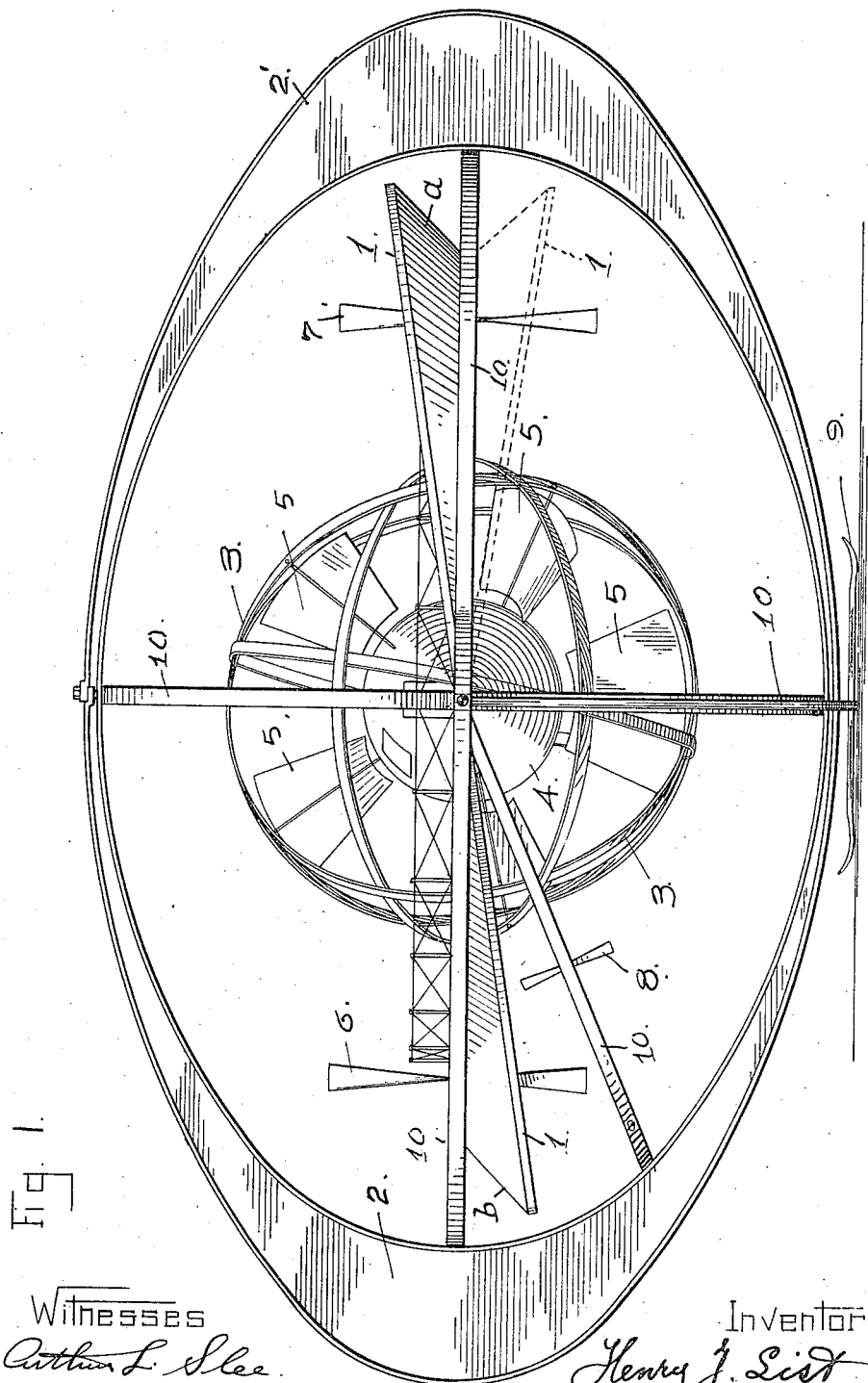

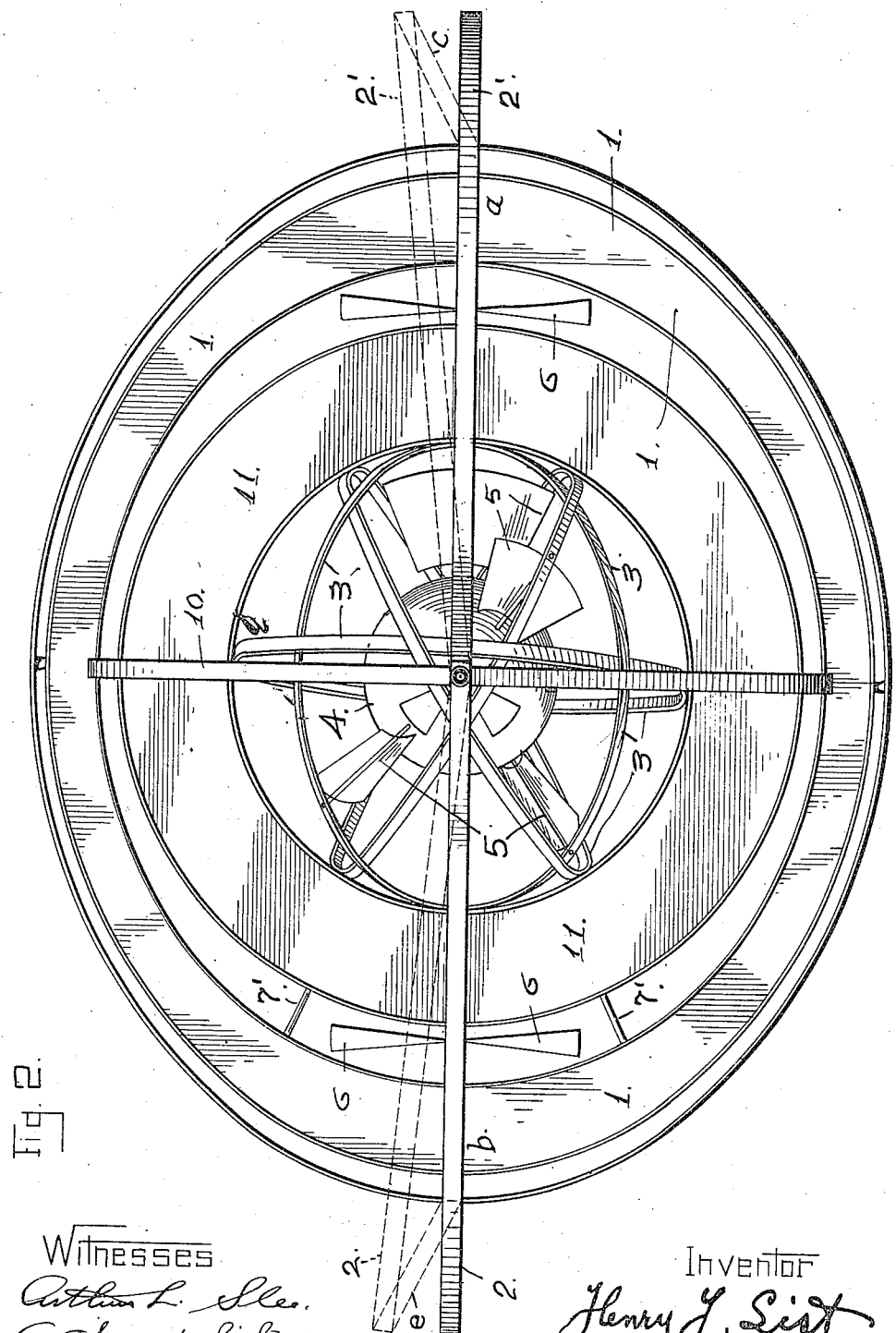

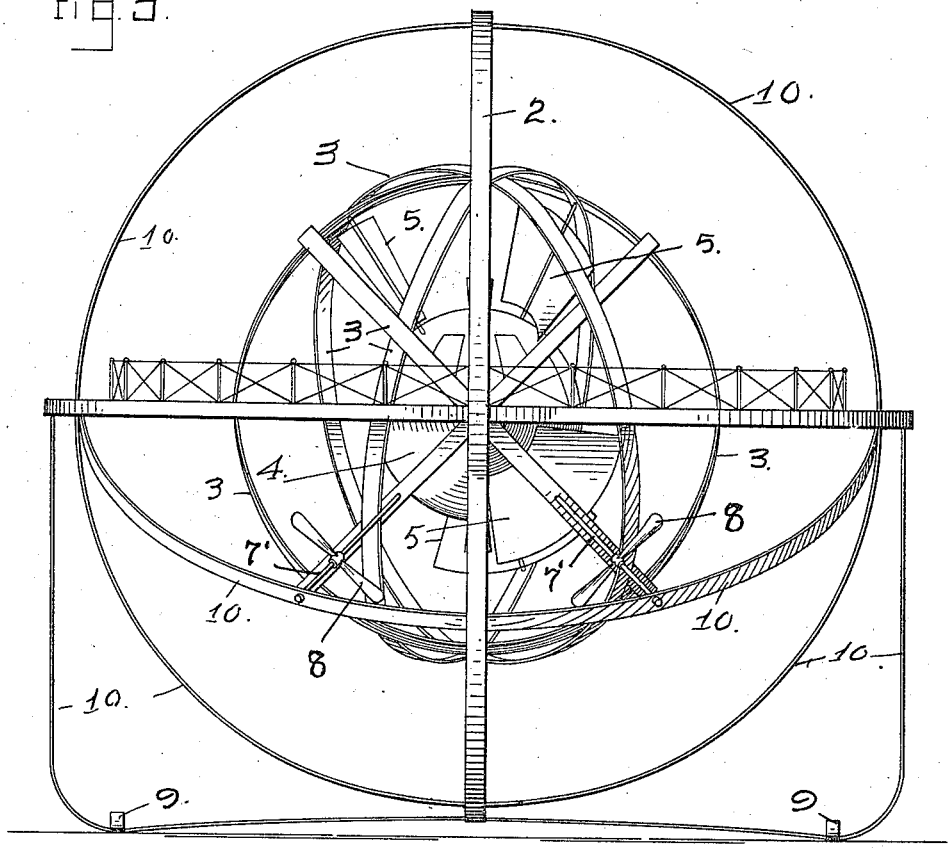

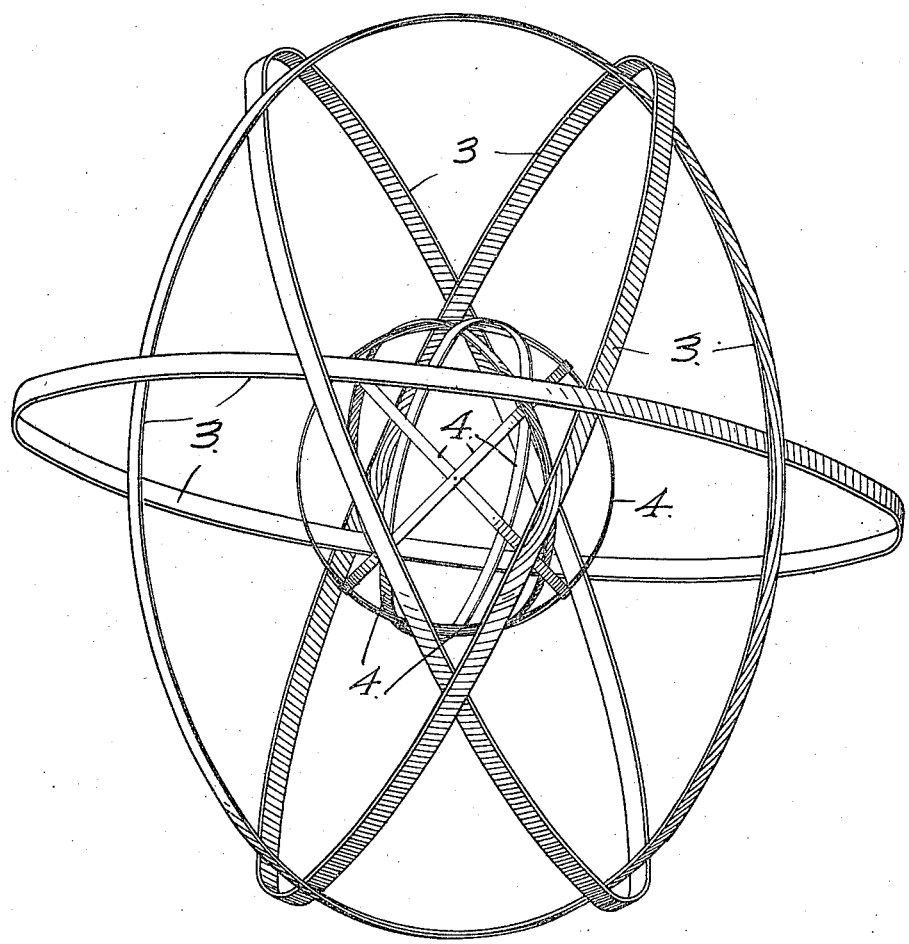

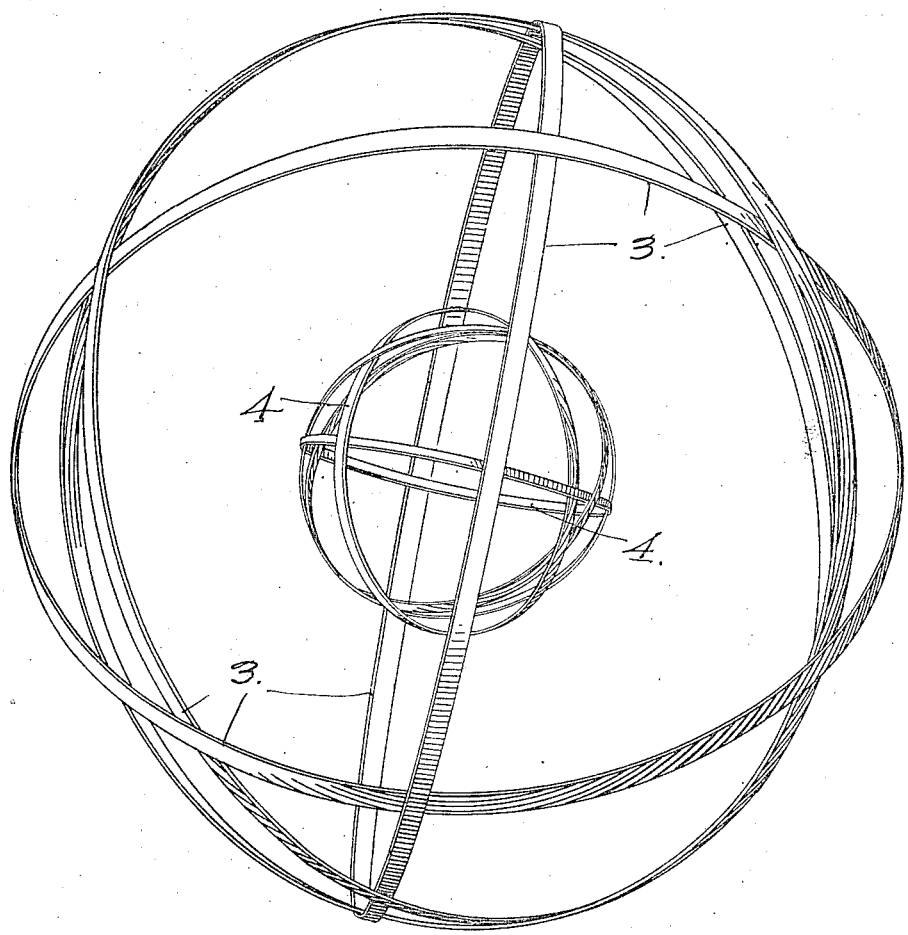

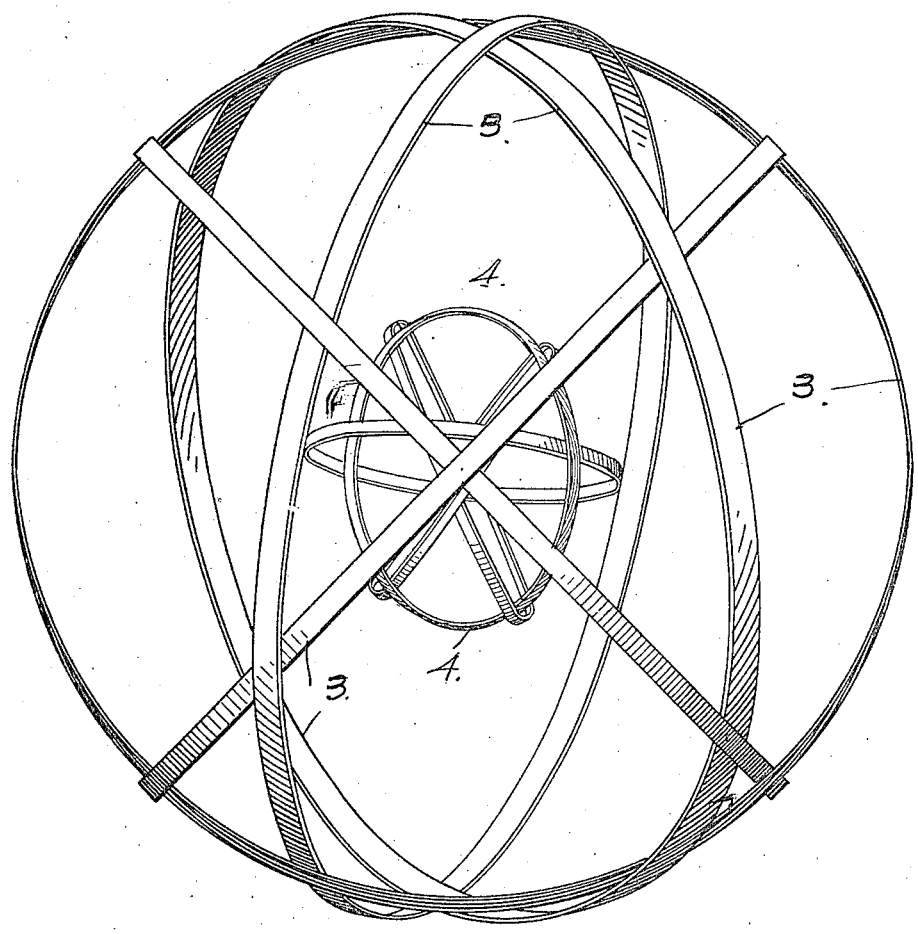

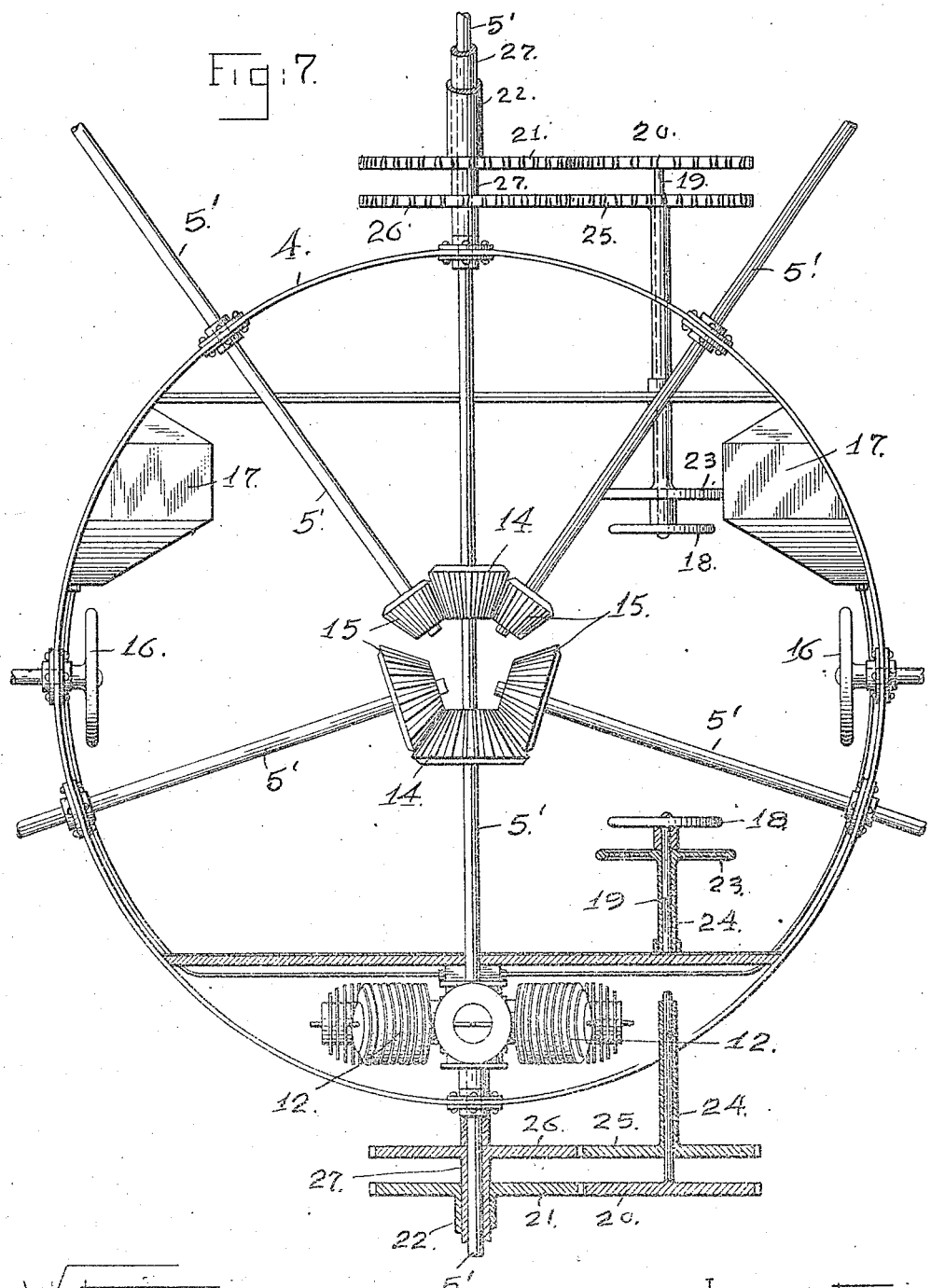

HENRY J. LIST, OF SAN FRANCISCO, CALIFORNIA.

AEROPLANE.

1,034,718.  Specification of Letters Patent.  Patented Aug. 6, 1912.

Application filed March 2, 1912. Serial No. 681,265.

*To all whom it may concern:*

Be it known that I, HENRY J. LIST, a subject of the Emperor of Austria-Hungary, residing in the city and county of San Francisco and State of California, have invented a new and useful Aeroplane, of which the following is a specification.

My invention relates to aero-plane construction and its object is to provide greater efficiency, durability and simplicity of manipulation.

The suspension of the aero-plane is dependent, while in flight, upon the horizontal plane as heretofore used by air crafts but I employ a novel construction of circular bands or hoops so arranged and connected as to provide resiliency and also durability in case the frame of said craft should accidentally or otherwise come into violent contact with the earth or any other object.

For a full comprehension of my construction, reference should be had to the accompanying drawings, in which—

Figure 1 is a side elevation of my aeroplane. Fig. 2 is a plan view thereof. Fig. 3 is a rear end elevation. Fig. 4 is a plan view of my double, quintuple, spherical construction, the propellers being eliminated. Fig. 5 is a side elevation of Fig. 4. Fig. 6 is a rear elevation of Fig. 4. Fig. 7 is a detailed view of the central, vertical ring of the quintuple construction, showing the driving shaft and its connections with the propeller shafts, the driving engine, fuel tanks and plane manipulating mechanisms.

A rigid horizontal plane 11 is secured to the frame 10 of the machine. Pivoted vertical planes 2 and 2' are secured to the frame 10 in a plane at right angles to the horizontal planes 11. A second horizontal plane 1 is pivoted at its center to the framework 10 of the machine. Within the center of the rigid plane 11 are rigidly secured five circular hoops 3. In the center of the hoops 3 are five smaller hoops 4. Within the space formed by the circular hoops 4 and the circular hoops 3, are propellers 5 rotated by the drive shafts 5' (Fig. 7). Fore and aft propellers 6 are further provided to give the ship a forward movement. Two smaller rear propellers 8, driven by shafts 7' are provided to give the ship an upward and forward movement. Runners 9 are provided at the lower portion of the frame 10 in order to maintain the craft in an upright position when on the ground.

An engine 12 of any suitable type is provided to drive the drive shaft 5' which through the medium of the beveled gears 14 and 15, drives the propellers 5. Hand wheels 16 (Fig. 7) are provided for the manipulation of the horizontal pivoted plane 1. Fuel tanks 17 of any suitable type are provided for the storage of fuel. Hand wheels 18 secured to the shafts 19 are used to rotate the gears 20. The gears 20 meshing with the gears 21 secured to the sleeves 22 are used to manipulate the forward vertical plane 2'. The hand wheels 23 secured to the sleeves 24 are used to rotate the gear 25. The gear 25 meshing with the gear 26 secured to the sleeve 27 manipulates the after vertically pivoted plane 2.

The operation or manipulation of the aeroplane is as follows. The upper propellers 5 are adapted to create a partial vacuum above the ship while the lower propellers 5 acting in conjunction with the upper propellers tend to exert a pressure below the aeroplane, the action of the upper and lower propellers having a tendency to keep the craft suspended. The fore and aft propellers 6 propel the ship forward with sufficient force to sustain the craft on a horizontal air stratum by means of the plane 11. The propellers 8 secured to the drive shafts 7' being slightly inclined upward, produce an upward as well as a forward movement. Should it be desired to elevate the ship while in motion, to a higher plane the horizontally pivoted plane 1 is inclined by means of the hand wheels 16 (Fig. 7) to the angle shown in Fig. 1. The inner edge of the fabric constituting the plane 1 being rigidly secured to the stationary frame work 10, an abrupt angular surface is presented to the atmosphere at the front of the ship as shown at *a* and a similar surface at the rear of the ship as shown at *b*. This surface *a* tends to force the front of the ship upward. The air being forced downward follows the surface of the plane 1 until it meets with the point *b*. This has a further tendency to force the rear end of the ship upward at the same speed as the front of the craft. Thus it will be seen that the ship travels upward in a plane parallel to the surface of the earth. In order to steer the ship to right or left the vertically pivoted planes 2 and 2' are manipulated independently or together, by means of the hand wheels 18 and 23. To steer the ship to the left the vertical planes 2 and 2' are set as shown by dotted lines in Fig. 2. These planes are similar in construction, operation and effect to the horizontally pivoted plane 1 with the exception that while the plane 1 is continuous and acts as a single plane, the planes 2 and 2' are pivoted at the center of the ship and are adapted to swing each independently of the other and in opposite directions. When the planes 2 and 2' are set as shown by the dotted lines in Fig. 2, the resistance offered at the front of the ship by the surface c, tends to swerve that portion of the ship to the left. The resistance offered by the surface e at the rear end of the ship, tends to swerve that portion to the right thus turning the craft in a circle until the desired location is attained.

The quintuple arrangement of the circular hoops provides, by reason of the arcs therein, a durable resiliency in case of violent contact with any object.

It is obvious from the foregoing that I have provided a simple and effective construction that is easy of manipulation, a craft that can be turned within a comparatively short radius as well as elevated in a plane parallel to the surface of the earth.

The details of construction being so susceptible to variation I do not wish to confine myself to the precise construction shown herein, but rather to avail myself of any modification that may fall properly within the scope of my invention.

Having thus described my invention, what I claim as new and desire to secure by Letters Patent is—

1. In an aeroplane, the combination of a rigid horizontal plane, a second horizontal plane elliptical in shape, having its inner edge rigidly secured and its outer edge being pivoted horizontally, vertical planes pivoted and adapted to swing, each independently of the other, five circular bands interlaced and secured in the center of the rigid horizontal plane and a second set of five circular bands rigidly secured in the center of the first set of circular bands, in the manner set forth and for the purpose described.

2. In an aeroplane, the combination of a rigid horizontal plane, a second horizontal plane elliptical in shape, having its inner edge rigidly secured and its outer edge being pivoted horizontally, vertical planes pivoted and adapted to swing, each independently of the other, five circular bands interlaced and secured to the center of the rigid horizontal plane, a second set of five circular bands rigidly secured in the center of the first set of circular bands and five propellers rotatably mounted within the space between the first and second set of circular bands, substantially as described.

3. In an aeroplane, the combination of a rigid horizontal plane, a second horizontal plane elliptical in shape, having its inner edge rigidly secured and its outer edge being pivoted horizontally, vertical planes pivoted and adapted to swing, each independently of the other, five circular bands interlaced and secured to the center of the rigid horizontal plane, a second set of five circular bands rigidly secured in the center of the first set of circular bands, five propellers rotatably mounted within the space between the first and second set of circular bands, fore and aft propellers rotatably mounted within the frame of the aeroplane, means for rotating the propellers and means for manipulating the pivoted planes in the manner set forth and for the purpose described.

In witness whereof I hereunto set my signature in the presence of two subscribing witnesses.

HENRY J. LIST.

Witnesses:
ARTHUR L. SLEE,
JAMES F. McCUE.